(12) United States Patent
Liu et al.

(10) Patent No.: US 11,926,787 B2
(45) Date of Patent: Mar. 12, 2024

(54) WELL CEMENTING METHOD FOR IMPROVING WELL CEMENTING QUALITY BY CONTROLLING HYDRATION HEAT OF CEMENT SLURRY

(71) Applicants: PetroChina Company Limited, Beijing (CN); CNPC Engineering Technology R&D Company Limited, Beijing (CN)

(72) Inventors: Shuoqiong Liu, Beijing (CN); Hua Zhang, Beijing (CN); Jianzhou Jin, Beijing (CN); Ming Xu, Beijing (CN); Yongjin Yu, Beijing (CN); Fengzhong Qi, Beijing (CN); Congfeng Qu, Beijing (CN); Hong Yue, Beijing (CN); Youcheng Zheng, Beijing (CN); Wei Li, Beijing (CN); Yong Ma, Beijing (CN); Youzhi Zheng, Beijing (CN); Zhao Huang, Beijing (CN); Jinping Yuan, Beijing (CN); Zhiwei Ding, Beijing (CN); Chongfeng Zhou, Beijing (CN); Chi Zhang, Beijing (CN); Zishuai Liu, Beijing (CN); Hongfei Ji, Beijing (CN); Yuchao Guo, Beijing (CN); Xiujian Xia, Beijing (CN); Yong Li, Beijing (CN); Jiyun Shen, Beijing (CN); Huiting Liu, Beijing (CN); Yusi Feng, Beijing (CN); Bin Lyu, Beijing (CN)

(73) Assignees: PetroChina Company Limited, Beijing (CN); CNPC Engineering Technology R&D Company Limited, Beijing (CN)

(*) Notice: Subject to any disclaimer, the term of this patent is extended or adjusted under 35 U.S.C. 154(b) by 126 days.

(21) Appl. No.: 16/854,376

(22) Filed: Apr. 21, 2020

(65) Prior Publication Data
US 2020/0399525 A1 Dec. 24, 2020

(30) Foreign Application Priority Data

Jun. 24, 2019 (CN) .......................... 201910547879.4

(51) Int. Cl.
*E21B 33/14* (2006.01)
*C09K 8/467* (2006.01)

(52) U.S. Cl.
CPC .............. *C09K 8/467* (2013.01); *E21B 33/14* (2013.01)

(58) Field of Classification Search
None
See application file for complete search history.

(56) References Cited

U.S. PATENT DOCUMENTS

| 4,997,487 A * | 3/1991 | Vinson ..................... C09K 8/46 106/725 |
| 5,184,680 A * | 2/1993 | Totten ..................... C09K 8/46 106/803 |
| 2019/0330513 A1 | 10/2019 | Jiminez et al. | |

FOREIGN PATENT DOCUMENTS

| CN | 101328050 A | 12/2008 |
| CN | 105802596 A | 7/2016 |

(Continued)

OTHER PUBLICATIONS

Michaux et al. Cement Chemistry and Additives "Well Completion" Oilfield Review, vol. 1, No. 1 (Jan. 2014). (Year: 2014).*

(Continued)

*Primary Examiner* — Charles R Nold
(74) *Attorney, Agent, or Firm* — Hamilton, Brook, Smith & Reynolds, P.C.

(57) ABSTRACT

A well cementing method is described for improving cementing quality by controlling the hydration heat of cement slurry. By controlling the degree and/or rate of hydration heat release from cement slurry, the method (Continued)

improves the hydration heat release during formation of cement with curing of cement slurry, improves the binding quality between the cement and the interfaces, and in turn improves the cementing quality at the open hole section and/or the overlap section. The cementing method improves cementing quality of oil and gas wells and reduces the risk of annular pressure.

13 Claims, 2 Drawing Sheets

(56) References Cited

FOREIGN PATENT DOCUMENTS

| | | |
|---|---|---|
| CN | 106401523 A | 2/2017 |
| CN | 106967399 A | 7/2017 |
| CN | 110248784 A | 9/2019 |
| EP | 1394813 A2 | 3/2004 |
| EP | 2933307 A1 | 10/2015 |
| GB | 2182031 A | 5/1987 |

OTHER PUBLICATIONS

Search Report for Chinese Application No. 201910547879.4, "Well Cementing Method for Improving Well Cementing Quality by Controlling Hydration Heat of Cement Slurry" dated Jun. 4, 2019.
People's Republic of China Cementing Quality Evaluation Method SY/ T 6592-2016, Dec. 5, 2016.
Wang Tongyou et al., "Study on Nano Calcium Silicate Hydrate Used as Oil Well Cement Accelerator", Drilling Fludi&Completion Fluid, vol. 34 No. 3, May 2017, 4 pages.
Chinese Search Report for counterpart Chinese patent application No. 201910547879.4 "Well cementation method for controlling hydration heat of cement paste and improving well cementation quality" dated May 30, 2022.

* cited by examiner

WELL CEMENTING METHOD FOR IMPROVING WELL CEMENTING QUALITY BY CONTROLLING HYDRATION HEAT OF CEMENT SLURRY

RELATED APPLICATIONS

This application claims priority under 35 U.S.C. § 119 or 365 to Chinese Patent Application No.: 201910547879.4, filed on Jun. 24, 2019, which is hereby incorporated by reference in its entirety.

TECHNICAL FIELD

The present invention relates to a well cementing method for improving cementing quality by controlling the hydration heat of cement slurry, and belongs to the technical field of cementing of oil wells.

BACKGROUND ART

With continuous progress in oil and gas exploration and development, a long-term safe and effective operation of oil and gas wells sets out strict requirement on shaft integrity, in which the sealing integrity of the cement sheath is essential to the shaft integrity. The sealing integrity of the cement sheath is generally reflected by the cementing quality and the wellhead annular pressure, and is key to ensuring good interlayer sealing in a cementing technology.

Well cementing as a one-off and hidden project is a comprehensive technology in which materials, mechanics, thermodynamics, chemistry, and the like need to be considered. Currently, with continued progress of cementing techniques such as cementing additives, cementing cement slurry systems, cementing tools and cementing processes, the cementing quality and annular pressure prevention have been significantly improved to an extent. However, cementing technologies remain "methodical but uncertain", because of the problem of difficulty in accurately controlling the matching between a slurry system and geological and engineering conditions, in spite of the relatively mature cementing techniques such as cementing additives, cementing cement slurry systems, cementing tools and cementing processes.

SUMMARY OF INVENTION

In order to solve the above technical problem, it is an objective of the present invention to provide a well cementing method for improving cementing quality. By controlling the degree and/or rate of hydration heat release from cement slurry, this method improves the binding quality between the cement being formed during curing of cement slurry and the interfaces, and in turn improves the cementing quality.

In order to achieve the above objective, the invention provides a well cementing method for improving cementing quality by controlling the hydration heat of cement slurry, wherein, by controlling the degree and/or rate of hydration heat release from the cement slurry, this method improves the hydration heat release during formation of cement with curing of the cement slurry, improves the binding quality between the cement and the interfaces, and in turn improves the cementing quality at the open hole section and/or the overlap section.

The above interfaces include the formation interface (i.e. the interface where the cement formed from cement slurry is in contact with the formation(s)) and/or the casing interface (i.e. the interface where the cement formed from cement slurry is in contact with the casing).

The inventors have found that during the final setting in a cementing process, the cement slurry undergoes a peak of hydration heat release while gradually hardening to form cement, the hydration heat release increases the temperature at the sealing section, and just after the final setting ends, the temperature at the sealing section would still be much higher than that of liquid cement slurry, and would gradually decrease over time to the temperature of the formation(s). The degree of change in the temperature of cement slurry at the sealing section has a certain correlation with the binding quality at the interfaces, that is, the cementing quality. However, this has not drawn attention, not to mention a strong interest, from the cementing industry, which greatly restricts the advance of cementing technologies.

The well cementing method for improving cementing quality by controlling the hydration heat of cement slurry provided according to the present invention proposes, in view of the degree of hydration heat release from the cement slurry, incorporating a suitable additive into the cement slurry system to control the degree and/or rate of hydration heat release from the cement slurry, so as to improve the binding quality between the cement being formed during curing of the cement slurry and the two interfaces, to ensure the cementing quality at the open hole section where the first interface is with a casing and the second interface is with the formation(s) and the cementing quality at the overlap section where both interfaces are with casings, and to provide a reasonable scientific principle for the selection of cement slurry systems for cementing at the open hole section and the overlap section.

In the above method, preferably, the cementing quality at the open hole section may be improved by increasing the degree and/or rate of hydration heat release from the cement slurry such that the difference in parameters between the formed cement and the formation(s), such as elastic modulus and thermal expansion coefficient, is smaller than the difference in the corresponding parameters between the cement and the casing. Moreover, it is preferable that the difference in parameters such as elastic modulus and thermal expansion coefficient between the cement and the formation(s) is as small as possible.

In the above method, increasing the degree of hydration heat release from the cement slurry can be achieved by adding a material generating a high hydration heat (for example, an accelerating early strength agent) to the cement slurry; and increasing the rate of hydration heat release from cement slurry means increasing the slope of the hydration heat curve, that is, steepening the curve, which is preferably achieved by either or both of (i) adding an accelerating early strength agent and (ii) shortening the additional safety time for thickening of cement slurry. The material generating a high hydration heat used in the present invention may be any material that can promote hydration of cement, and preferably includes accelerating early strength agents. The accelerating early strength agent used in the present invention preferably includes one of or a combination of two or more of: sodium chloride, sodium carbonate, sodium formate, sodium nitrite, calcium chloride, calcium formate, calcium sulfate, calcium metasilicate, sodium aluminate, metakaolin, magnesium trisilicate, magnesium oxide, strontium sulfate, strontium carbonate, strontium nitrate, lithium carbonate, gypsum, hemihydrate gypsum, dihydrate gypsum, magnesium oxide, calcium oxide, activated slag, and ultra-fine cement.

In the above method, preferably, the cementing quality at the overlap section may be improved by lowering the degree and/or rate of hydration heat release from cement slurry to reduce the temperature variation during formation of cement with curing of the cement slurry; wherein the temperature variation refers to the difference between the highest and lowest temperatures during formation of cement with curing of the cement slurry. In the early stage of curing, the above-mentioned temperature refers to the temperature of cement slurry; in the middle stage of curing, the above-mentioned temperature refers to the temperature of the mixture of cement slurry and cured cement slurry; and in the late stage of curing, the above-mentioned temperature refers to the temperature of cured cement. In the above method, lowering the degree of hydration heat release from cement slurry is achieved by adding an inert material to the cement slurry, reducing the addition amount of a material generating a high hydration heat, and/or prolonging the additional safety time for thickening of cement slurry, wherein reducing the addition amount of a material generating a high hydration heat is relative to ordinary cement slurry or cement slurry used in the prior art. Lowering the rate of hydration heat release from cement slurry means decreasing the slope of the hydration heat curve, that is, making the curve gentler, which is achieved preferably by adding a retarder and/or prolonging the additional safety time for thickening of cement slurry. The inert material used in the present invention includes one or of a combination of two or more of: iron ore powder, barite, hollow glass beads and quartz sand; and the retarder used in the present invention includes one or a combination of two or more of: an organic phosphonate-based retarder, an AMPS (2-acrylamide-2-methylpropanesulfonic acid)-based retarder, a phosphate-based retarder, glucose, and sodium borate.

The method provided by the invention is a method for improving cementing quality by adjusting the hydration heat of cement slurry. The cement slurry itself contains certain components, such as a cement component and other conventional components, wherein the cement component is preferably one of or a combination of two or more of class A oil well cement, class B oil well cement, class C oil well cement, class D oil well cement, class E oil well cement, class F oil well cement, class G oil well cement, class H oil well cement, and class J oil well cement. Moreover, the cement slurry may further contain one or a combination of two or more of a toughening agent, a fluid loss additive, a dispersant, a defoaming agent, a fleeing-proof agent, silica, and water.

In addition to the hydration heat of cement slurry, the strength and/or elastic modulus of the cement formed from the cement slurry may be further considered in accordance with the method provided by the present invention. That is, the well cementing method includes a step or operation of controlling the strength and/or elastic modulus of the cement formed from the cement slurry. The strength and elastic modulus of the cement slurry may be adjusted by conventional technical means according to the requirements set by the present invention. For example, the strength of cement may be increased mainly by addition of materials promoting cement hydration, for example, an early strength agent or a reinforcing agent; and the elastic modulus of cement may be reduced by addition of a material whose elastic modulus is lower than that of pure cement, such as rubber powder.

In the above method, preferably, for well cementing at the pure overlap section, controlling of hydration heat is achieved by lowering the degree and/or rate of hydration heat release from the cement slurry; wherein the cement slurry is cement slurry with high strength and low elastic modulus, the additional safety time is 60-300 minutes for thickening of the lead slurry or 30-200 minutes for thickening of the tail slurry.

In the above method, preferably, the well cementing is performed on a long-overlap-section well having a length of overlap section greater than 150 m; wherein for well cementing with single setting cement slurry, controlling of hydration heat is achieved by lowering the degree and/or rate of hydration heat release from the cement slurry; wherein the cement slurry is cement slurry with high strength and low elastic modulus, and its additional safety time for thickening is 60-300 minutes;

for well cementing with separable setting cement slurry, for the lead slurry, controlling of hydration heat is achieved by lowering the degree and/or rate of hydration heat release from the slurry, wherein the lead slurry is cement slurry with high strength and low elastic modulus, and its additional safety time for thickening is 60-300 minutes; and for the tail slurry, controlling of hydration heat is achieved by increasing the degree and/or rate of hydration heat release from the slurry, wherein the tail slurry is cement slurry with high strength, and its additional safety time for thickening is 30-60 minutes;

for well cementing with multi-setting cement slurry, for the lead slurry, controlling of hydration heat is achieved by lowering the degree and/or rate of hydration heat release from the slurry, wherein the lead slurry is cement slurry with high strength and low elastic modulus, and its additional safety time for thickening is 60-300 minutes; for the intermediate slurry, controlling of hydration heat is achieved by lowering the degree and/or rate of hydration heat release from the slurry, wherein the intermediate slurry is cement slurry with high strength and low elastic modulus, and its additional safety time for thickening is 60-200 minutes; and for the tail slurry, controlling of hydration heat is achieved by increasing the degree and/or rate of hydration heat release from the slurry, wherein the tail slurry is cement slurry with high strength, and its additional safety time for thickening is 30-60 minutes.

In the above method, preferably, for the well cementing which is performed with separable setting cement slurry or multi-setting cement slurry on a long-overlap-section well having a length of the overlap section greater than 150 m, the tail slurry enters the overlap section by 100 m or more. There is a mixed section from the lead slurry and the tail slurry during operation, and controlling of the distance by which the tail slurry enters the overlap section can ensure that the overlap section contains cement slurry generating a low hydration heat and the open hole section contains cement slurry generating a high hydration heat. However, the tail slurry should not enter the overlap section too much, and it is preferable that the distance is 100-300 m.

In the above method, preferably, the well cementing is performed on a short-overlap-section well having a length of the overlap section not greater than 150 m; wherein for well cementing with single setting cement slurry, controlling of hydration heat is achieved by lowering the degree and/or rate of hydration heat release from the cement slurry; wherein the cement slurry is cement slurry with high strength and low elastic modulus, and its additional safety time for thickening is 60-300 minutes;

for well cementing with separable setting cement slurry, for the lead slurry, controlling of hydration heat is achieved by lowering the degree and/or rate of hydration heat release from the slurry, wherein the lead slurry is cement slurry with high strength and low elastic modulus, and its additional safety time for thickening is 60-300 minutes; and for the tail slurry, controlling of hydration heat is achieved by increasing the degree and/or rate of hydration heat release from the slurry, wherein the tail slurry is cement slurry with high strength, and its additional safety time for thickening is 30-60 minutes;

for well cementing with multi-setting cement slurry, for the lead slurry, controlling of hydration heat is achieved by lowering the degree and/or rate of hydration heat release from the slurry, wherein the lead slurry is cement slurry with high strength and low elastic modulus, and its additional safety time for thickening is 60-300 minutes; for the intermediate slurry, controlling of hydration heat is achieved by increasing the degree and/or rate of hydration heat release from the slurry, wherein the intermediate slurry is cement slurry with high strength, and its additional safety time for thickening is 60-200 minutes; and for the tail slurry, controlling of hydration heat is achieved by increasing the degree and/or rate of hydration heat release from the slurry, wherein the tail slurry is cement slurry with high strength, and its additional safety time for thickening is 30-60 minutes.

In the above method, preferably, the high strength occurs when the strength of the cement formed from the cement slurry is not lower than the compression strength of pure cement under the same conditions; and more preferably, the high strength occurs when the 7-day strength is greater than 28 MPa.

In the above method, preferably, the low elastic modulus occurs when the elastic modulus of the cement formed from the cement slurry is smaller than that of pure cement under the same conditions; and more preferably, the low elastic modulus occurs when the elastic modulus is less than 10 GPa.

The well cementing method for improving cementing quality by controlling the degree of hydration heating of cement slurry as provided according to the present invention, in view of the degree of hydration heat release from the cement slurry, controls the degree and/or rate of hydration heat release from the cement slurry, so as to improve the binding quality between the cement being formed with curing of the cement slurry and the two interfaces, to ensure the cementing quality, and to provide a reasonable scientific principle for the selection of cement slurry systems for cementing at the open hole section and the overlap section. This further enriches the theory of cementing technologies, realizes to a certain extent a solid improvement in the binding quality between the cement and the two interfaces at the open hole section and the overlap section, reduces the risk of poor cementing quality at the open hole section and the overlap section, and improves the cementing technology, therefore providing a strong technical support for improvement in cementing quality of oil and gas wells and reduction of the risk of annular pressure, and hence having great significance for the sustainable development of exploration of oil and gas resources.

The present invention proposes for the first time a cementing method that improves cementing quality by controlling the hydration heat of cement slurry, which is a milestone breakthrough in the cementing technology, thus greatly promoting the technical progress of the cementing industry, providing a strong technical support for improvement in cementing quality of oil and gas wells and reduction of the risk of annular pressure, and hence having great significance for the sustainable development of exploration of oil and gas resources.

DETAILED DESCRIPTION

Figure 1:
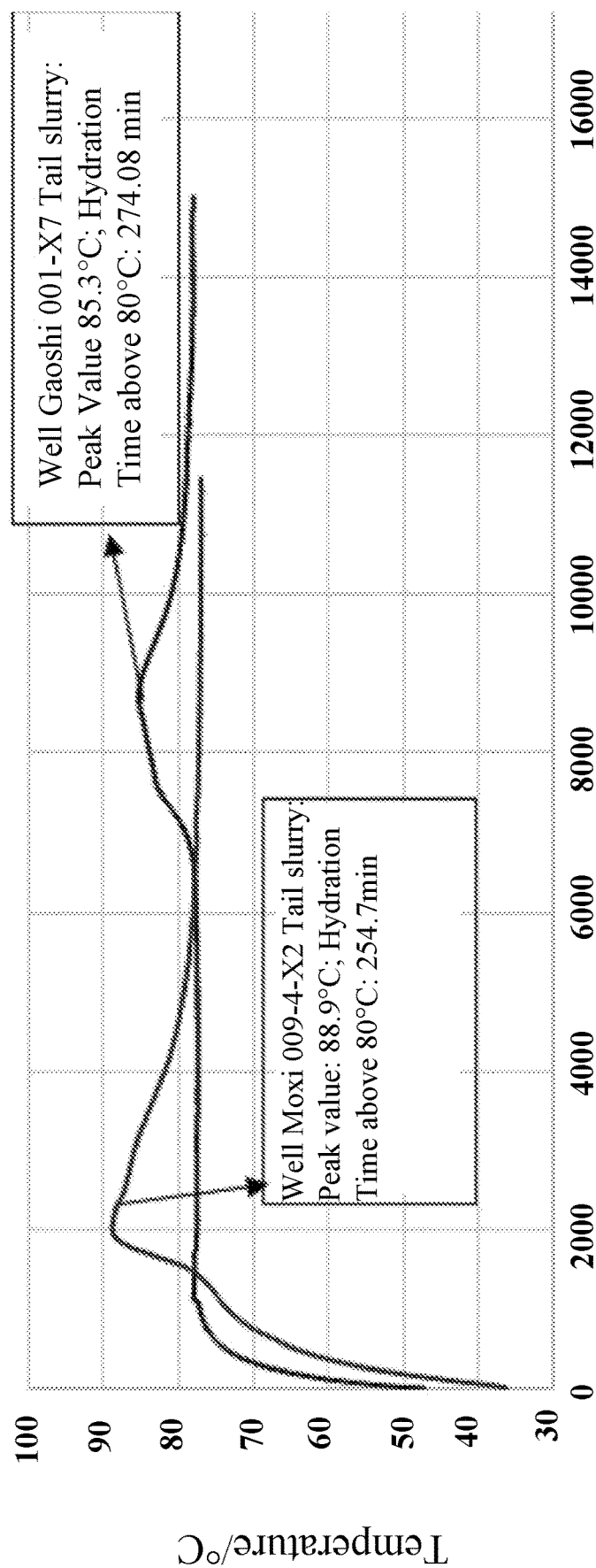
FIG. 1 shows the hydration heat release curves of the cement slurries in Example 1.

The technical solutions of the invention will be described in detail below in order to allow a clearer understanding of the technical features, purposes and beneficial effects of the present invention, but the following description should not be construed as limiting the implementable scope of the present invention.

Definitions

Well cementing: an operation of inserting casing(s) into a well and injecting cement into the annular space between the well bore and the casing(s).

Formation interface: the interface between the cement formed from cement slurry and the formation(s).

Casing interface: the interface between cement formed from cement slurry and the casing(s).

Hydration heat: the heat released when a substance is hydrated with water. The hydration heat of cement is also called hardening heat, which involves a series of actions such as hydration, hydrolysis and crystallization. The hydration heat can be measured directly in a calorimeter, or calculated indirectly from heat of fusion.

Degree of hydration heat release: represented by the peak temperature in the hydration heat release curve of cement slurry; the higher the temperature, the higher the degree of hydration heat release is, while the lower the temperature, the lower the degree of hydration heat release is.

Rate of hydration heat release: represented by the time interval from the peak temperature to the final temperature that no longer changes in the hydration heat release curve of cement slurry; the longer the time interval, the lower the rate of hydration heat release is, while the shorter the time interval, the higher the rate of hydration heat release is. The rate of hydration heat release may also be expressed as the slope of the curve after the point of peak temperature; the smaller the slope, the lower the rate of hydration heat release is, while the greater the slope, the higher the rate of hydration heat release is.

Initial setting: the initial setting of cement is a phenomenon that plastic cement slurry formed by mixing dry powder of Portland cement with a proper amount of water gradually thickens at normal temperature until it begins to lose plasticity.

Finial setting: a state that the cement slurry formed by mixing cement and water completely loses plasticity and completely hardens.

Lead slurry: the cement slurry first injected into the well during construction.

Tail slurry: the cement slurry finally injected into the well during construction.

Intermediate slurry: the cement slurry injected into the well between the lead slurry and the tail slurry during construction.

Open hole section: a section of a well having only one well pipe, outside which there is the formation(s). At this section, cement slurry hardens to form cement outside the well pipe after it is injected. During the hardening, the cement slurry is in contact with the formation(s) and forms an interface therewith, namely the formation interface.

Overlap section: a section of a well having casings consisting of two well pipes. At this section, the cement slurry enters the annular space between the two well pipes and hardens to form cement. During the hardening, the cement slurry is in contact with the two well pipes and form two interfaces, namely two casing interfaces.

Long-overlap-section well: a well having a length of the overlap section greater than 150 m.

Short-overlap-section well: a well having a length of the overlap section not greater than 150 m, excluding wells without an overlap section.

Example 1

The Example provides a well cementing method for a well with a pure overlap section. Since it is impossible to use different cement slurries for cementing of the same well, this Example used different cement slurries for cementing of two similar wells and compared the cementing quality. Well Moxi 009-4-X2 and Well Gaoshi 001-X7 both use 177.8 mm tie-back casings, that is, they are of a pure overlap section. Conventional cement slurry was used for Well Moxi 009-4-X2, and the cement slurry with controlled hydration heat was used for Well Gaoshi 001-X7. Specifically, the degree and rate of hydration heat release from the cement slurry were reduced by reducing the amount of an accelerating early strength agent used in the cement slurry to reduce the peak value of hydration heat release from the cement slurry, and simultaneously increasing the added amount of a retarder so as to extend the additional safety time for thickening of the cement slurry, so that the peak value and the rate of hydration heat release from the cement slurry were reduced.

The basic information is shown in Table 1, and the hydration heat release curves of the cement slurries are shown in FIG. 1.

TABLE 1

| Casings | Lead slurry | Tail slurry | Cementing quality |
|---|---|---|---|
| Well Moxi 009-4-X2, 177.8 mm tie-back casings | High hydration heat; Fast development of early strength; Additional safety time for thickening of the tail slurry: 95 minutes; Lead slurry formulation: Jiahua Class G well cement + 4.2% accelerating early strength agent (calcium sulfate:sodium sulfate:calcium formate = 2:2:1) + 4% rubber toughening material + 2% AMPS-based fluid loss additive + 1% organic phosphonate-based retarder + 0.5% aldehyde ketone polymer dispersant + 0.2% dimethyl silicone oil defoamer + 46% tap water; Density: 1.92 g/cm$^3$ | High hydration heat; Fast development of early strength; Additional safety time for thickening of the tail slurry: 34 minutes; Tail slurry formulation: Jiahua Class G well cement + 3% accelerating early strength agent (calcium sulfate:sodium sulfate:calcium formate = 2:2:1) + 4% rubber toughening material + 2% AMPS-based fluid loss additive + 0.3% organic phosphonate-based retarder + 0.4% aldehyde ketone polymer dispersant + 0.2% dimethyl silicone oil defoamer + 45% tap water; Density: 1.92 g/cm$^3$ | Poor |
| Well Gaoshi 001-X7, 177.8 mm tieback casings | Moderate-to-low hydration heat; Fairly fast development of early strength; Additional safety time for thickening of the lead slurry: 149 minutes; Lead slurry formulation: Jiahua Class G well cement + 1% accelerating early strength agent (calcium sulfate:sodium sulfate:calcium formate = 2:2:1) + 4% rubber toughening material + 2% AMPS-based fluid loss additive + 1.5% organic phosphonate-based retarder + 0.5% aldehyde ketone polymer dispersant + 0.2% dimethyl silicone oil defoamer + 45.5% tap water; Density: 1.92 g/cm$^3$ | Moderate-to-low hydration heat; Fairly fast development of early strength; Additional safety time for thickening of the tail slurry: 116 minutes; Tail slurry formulation: Jiahua Class G well cement + 4% rubber toughening material + 2% AMPS-based fluid loss additive + 0.8% organic phosphonate-based retarder + 0.4% aldehyde ketone polymer dispersant + 0.2% dimethyl silicone oil defoamer + 44% tap water; Density: 1.92 g/cm$^3$ | Excellent |

FIG. 1 shows the hydration heat release curves of the two tail slurries in this Example. Through comparison of the peak value of heat release and the rate of heat release shown in FIG. 1, it can be seen that, as compared to the conventional cement slurry used for Well Moxi 009-4-X2, the cement slurry with controlled hydration heat used for Well Gaoshi 001-X7 not only contained a significantly lower amount of accelerating early strength agent (a material generating high hydration heat), which reduced the peak value of hydration heat release from the cement slurry; but also had more retarder, which prolonged the thickening time of the cement slurry to meet the requirement for a prolonged additional safety time for thickening of cement slurry, and reduced the peak value and rate of hydration heat release from the cement slurry. By such means, excellent cementing quality was obtained for Well Gaoshi 001-X7, while the cementing quality of Well Moxi 009-4-X2 using conventional cement slurry was poor.

The cementing quality was evaluated in accordance with the petroleum and natural gas industry standard of the People's Republic of China "Cementing Quality Evaluation Method SY/T 6592-2016".

Example 2

This Example provided a well cementing method for a short-overlap-section well, by which cementing was performed on Well Moxi 008-X23 (177.8 mm tail casing), i.e. on the short overlap section, while tail slurry was not allowed to enter the overlap section.

The cement slurries used for Well Moxi 008-X23 were cement slurries with controlled hydration heat, which was specifically controlled as follows:

Lead slurry: as compared to the tail slurry, the lead slurry used a lower amount of accelerating early strength agent to reduce the peak value of hydration heat release from the cement slurry; and a higher amount of retarder to prolong the thickening time, meeting the required additional safety time for thickening of cement slurry; so that the peak value and the rate of hydration heat release from the cement slurry were reduced;

Tail slurry: as compared to the lead slurry, the tail slurry used a higher amount of accelerating early strength agent to increase the peak value of hydration heat release from the cement slurry; and a lower amount of retarder to shorten the thickening time, meeting the required additional safety time for thickening of cement slurry; so that the peak value and the rate of hydration heat release from the cement slurry were increased.

Figure 2:
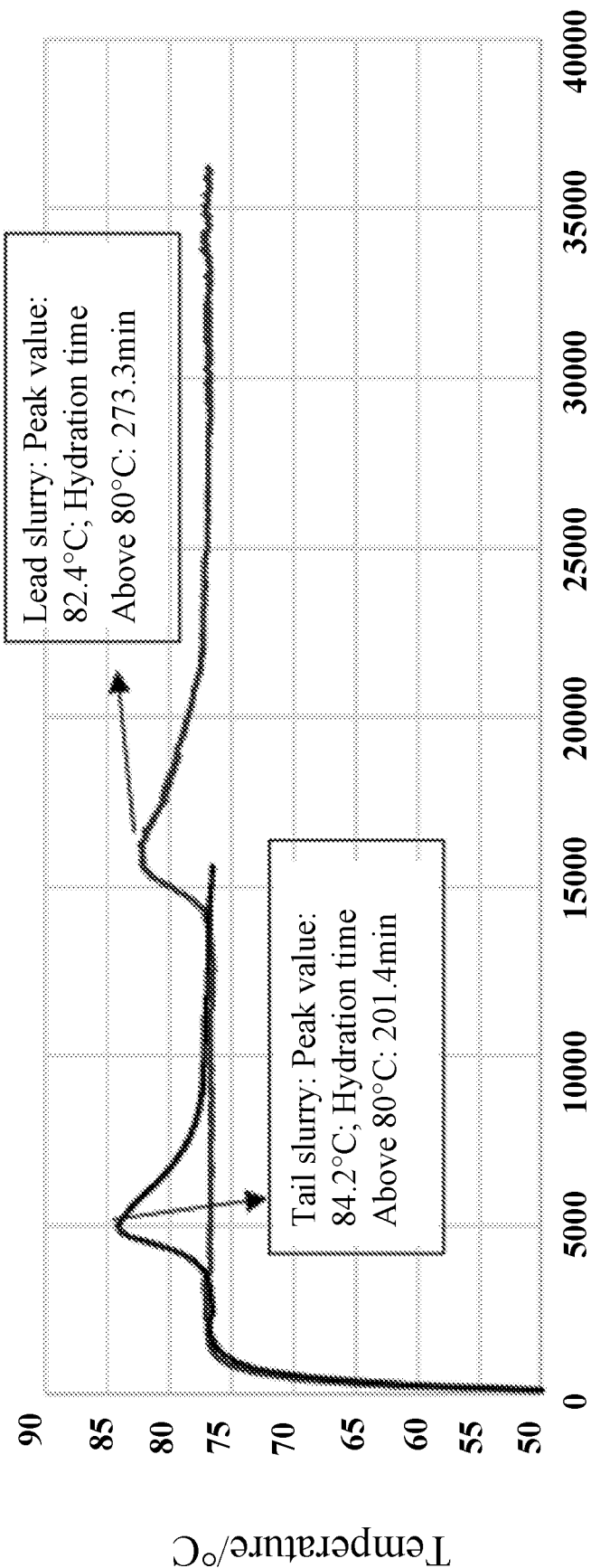
FIG. 2 shows the hydration heat release curves of the cement slurries in Example 2.

The basic information is shown in Table 2, and the hydration heat release curves of the cement slurries are shown in FIG. 2.

FIG. 2 showed the hydration heat release curves of the lead slurry and the tail slurry in this Example. It can be seen from FIG. 2 that different control means lead to different hydration heat releases between the lead slurry and the tail slurry. Therefore, excellent cementing quality was obtained for Well Moxi 008-X23.

The cementing quality was evaluated in accordance with the petroleum and natural gas industry standard of the People's Republic of China "Cementing Quality Evaluation Method SY/T 6592-2016".

The experimental results of the above Examples indicate that the method according to the present invention can actually realize to a certain extent a solid improvement in the binding quality between the cement and the two interfaces at the open hole section and the overlap section, reduce the risk of poor cementing quality of the open hole section and the overlap section, and improve the cementing quality.

The invention claimed is:

1. A well cementing method for improving cementing quality of a well, comprising: controlling the hydration heat of cement slurry to control the degree and rate of hydration heat release from the cement slurry, wherein
　　the method improves the hydration heat release during formation of cement with curing of cement slurry, improves the binding quality between the cement and the interfaces, and in turn improves the cementing quality at an overlap section of a well;
　　wherein when the controlling is achieved the cementing quality at the overlap section is improved;
　　wherein lowering the degree of hydration heat release from cement slurry is achieved by reducing the addition amount of a material generating a high hydration heat;
　　wherein lowering the rate of hydration heat release from cement slurry is achieved by adding a retarder;
　　wherein the well cementing is performed on a short-overlap-section well having a length of the overlap section not greater than 150 m; wherein
　　for well cementing with a separable setting cement slurry comprising a lead slurry and a tail slurry, wherein for the lead slurry, controlling of hydration heat is achieved

TABLE 2

| Casing | Lead slurry | Tail slurry | Cementing quality |
|---|---|---|---|
| Well Moci 008-X23; 177.8 mm tail casing | Moderate-to-low hydration heat; Fairly fast development of early strength; Additional safety time for thickening of the lead slurry: 117 minutes; Lead slurry formulation: Jiahua Class G well cement + 1% accelerating early strength agent (calcium sulfate:sodium sulfate:magnesium oxide = 2:2:1) + 20% quartz sand + 4% rubber toughening material + 2.8% AMPS-based fluid loss additive + 1.3% AMPS-based retarder + 1.2% Palygorskite suspending agent + 90% iron ore powder + 0.9% aldehyde ketone polymer dispersant + 0.2% dimethyl silicone oil defoamer + 67.5% tap water; Density: 2.26 g/cm$^3$ | High hydration heat; Fast development of early strength; Additional safety time for thickening of the tail slurry: 32 minutes; Lead slurry formulation: Jiahua Class G well cement + 6% accelerating early strength agent (calcium sulfate:sodium sulfate:magnesium oxide = 2:2:1) + 30% quartz sand + 4% rubber toughening material + 2.8% AMPS-based fluid loss additive + 1.3% AMPS-based retarder + 1.2% Palygorskite suspending agent + 90% iron ore powder + 0.9% aldehyde ketone polymer dispersant + 0.2% dimethyl silicone oil defoamer + 72.8% tap water; Density: 2.26 g/cm$^3$ | Excellent | by lowering the degree and rate of hydration heat release from the slurry, wherein the lead slurry is cement slurry with high strength and low elastic modulus, and its additional safety time for thickening is 60-300 minutes; and wherein for the tail slurry, controlling of hydration heat is achieved by increasing the degree and rate of hydration heat release from the slurry, wherein the tail slurry is cement slurry with high strength, and its additional safety time for thickening is 30-60 minutes;

wherein the high strength occurs when the 7-day strength is greater than 28 MPa, and the low elastic modulus occurs when the elastic modulus is less than 10 GPa.

2. The well cementing method according to claim 1, wherein increasing the degree of hydration heat release from cement slurry is achieved by adding a material generating a high hydration heat to cement slurry.

3. The well cementing method according the claim 2, wherein the material generating a high hydration heat includes an accelerating early strength agent.

4. The well cementing method according to claim 3, wherein the accelerating early strength agent includes one of, or a combination of two or more of: sodium chloride, sodium carbonate, sodium formate, sodium nitrite, calcium chloride, calcium formate, calcium sulfate, calcium metasilicate, sodium aluminate, metakaolin, magnesium trisilicate, magnesium oxide, strontium sulfate, strontium carbonate, strontium nitrate, lithium carbonate, gypsum, hemihydrate gypsum, dihydrate gypsum, magnesium oxide, calcium oxide, activated slag, and ultra-fine cement.

5. The well cementing method according to claim 1, wherein increasing the rate of hydration heat release from cement slurry is achieved by shortening the additional safety time for thickening of cement slurry.

6. The well cementing method according to claim 1, wherein the retarder includes an AMPS-based retarder.

7. The well cementing method according claim 1, wherein the cement component in the cement slurry is one of or a combination of two or more of: class A oil well cement, class B oil well cement, class C oil well cement, class D oil well cement, class E oil well cement, class F oil well cement, class G oil well cement, class H oil well cement, and class J oil well cement.

8. The well cementing method according to claim 7, wherein the cement slurry further contains one of or a combination of two or more of: a toughening agent, a fluid loss additive, a dispersant, a defoaming agent, a fleeing-proof agent, silica, and water.

9. The well cementing method according to claim 1, wherein
for well cementing with single setting cement slurry, controlling of hydration heat is achieved by lowering the degree and rate of hydration heat release from the cement slurry; wherein the cement slurry is cement slurry with high strength and low elastic modulus, and its additional safety time for thickening is 60-300 minutes;
for well cementing with multi-setting cement slurry comprising a lead slurry, an intermediate slurry and a tail slurry, wherein for the lead slurry, controlling of hydration heat is achieved by lowering the degree and rate of hydration heat release from the slurry, wherein the lead slurry is cement slurry with high strength and low elastic modulus, and its additional safety time for thickening is 60-300 minutes; wherein for the intermediate slurry, controlling of hydration heat is achieved by increasing the degree and rate of hydration heat release from the slurry, wherein the intermediate slurry is cement slurry with high strength, and its additional safety time for thickening is 60-200 minutes; and wherein for the tail slurry, controlling of hydration heat is achieved by increasing the degree and rate of hydration heat release from the slurry, wherein the tail slurry is cement slurry with high strength, and its additional safety time for thickening is 30-60 minutes.

10. A well cementing method for improving cementing quality of a well, comprising:
controlling the hydration heat of cement slurry to control the degree and rate of hydration heat release from the cement slurry, wherein
the method improves the hydration heat release during formation of cement with curing of cement slurry, improves the binding quality between the cement and the interfaces, and in turn improves the cementing quality at an overlap section of a well;
wherein for well cementing of a well of a pure overlap section, hydration heat is controlled by lowering the degree and rate of hydration heat release from cement slurry; wherein the cement slurry is cement slurry with high strength and low elastic modulus, the additional safety time is 60-300 minutes for thickening of the lead slurry and 30-200 minutes for thickening of the tail slurry;
wherein the high strength occurs when the 7-day strength is greater than 28 MPa, and the low elastic modulus occurs when the elastic modulus is less than 10 GPa.

11. A well cementing method for improving cementing quality of a well, comprising:
controlling the hydration heat of cement slurry to control the degree and rate of hydration heat release from the cement slurry;
wherein the method improves the hydration heat release during formation of cement with curing of cement slurry, improves the binding quality between the cement and the interfaces, and in turn improves the cementing quality at an overlap section of a well;
wherein when the controlling is achieved, the cementing quality at the overlap section is improved by lowering the degree and rate of hydration heat release from cement slurry;
wherein lowering the degree of hydration heat release from cement slurry is achieved by reducing the addition amount of a material generating a high hydration heat; wherein lowering the rate of hydration heat release from cement slurry is achieved by adding a retarder;
wherein the well cementing is performed on a long-overlap-section well having a length of overlap section greater than 150 m; wherein
for well cementing with single setting cement slurry, controlling of hydration heat is achieved by lowering the degree and/or rate of hydration heat release from the cement slurry; wherein the cement slurry is cement slurry with high strength and low elastic modulus, and its additional safety time for thickening is 60-300 minutes;
for well cementing with separable setting cement slurry comprising a lead slurry and a tail slurry, wherein for the lead slurry, controlling of hydration heat is achieved by lowering the degree and/or rate of hydration heat release from the slurry, wherein the lead slurry is cement slurry with high strength and low elastic modulus, and its additional safety time for thickening is 60-300 minutes; and wherein for the tail slurry, controlling of hydration heat is achieved by increasing the degree and/or rate of hydration heat release from the slurry, wherein the tail slurry is cement slurry with high strength, and its additional safety time for thickening is 30-60 minutes;

for well cementing with multi-setting cement slurry comprising a lead slurry, an intermediate slurry and a tail slurry, wherein for the lead slurry, controlling of hydration heat is achieved by lowering the degree and rate of hydration heat release from the slurry, wherein the lead slurry is cement slurry with high strength and low elastic modulus, and its additional safety time for thickening is 60-300 minutes; wherein for the intermediate slurry, controlling of hydration heat is achieved by lowering the degree and/or rate of hydration heat release from the slurry, wherein the intermediate slurry is cement slurry with high strength and low elastic modulus, and its additional safety time for thickening is 60-200 minutes; and wherein for the tail slurry, controlling of hydration heat is achieved by increasing the degree and rate of hydration heat release from the slurry, wherein the tail slurry is cement slurry with high strength, and its additional safety time for thickening is 30-60 minutes;

wherein the high strength occurs when the 7-day strength is greater than 28 MPa, and the low elastic modulus occurs when the elastic modulus is less than 10 GPa.

12. The well cementing method according to claim 11, wherein for well cementing with separable setting cement slurry or multi-setting cement slurry, the tail slurry enters the overlap section by 100 m or more.

13. The well cementing method according to claim 12, wherein for well cementing with separable setting cement slurry or multi-setting cement slurry, the tail slurry enters the overlap section by 100 m to 300 m.

* * * * *